US010680916B2

(12) United States Patent
Saxena et al.

(10) Patent No.: US 10,680,916 B2
(45) Date of Patent: Jun. 9, 2020

(54) MANAGEMENT OF NETWORK ELEMENTS IN A CLOUD PLATFORM (71) Applicant: HEWLETT PACKARD ENTERPRISE DEVELOPMENT LP, Houston, TX (US)

(72) Inventors: Vinay Saxena, Richardson, TX (US); Arun Thulasi, Cupertino, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 192 days.

(21) Appl. No.: 15/714,784

(22) Filed: Sep. 25, 2017

(65) Prior Publication Data
US 2019/0097901 A1 Mar. 28, 2019

(51) Int. Cl.
H04L 12/26 (2006.01)
H04L 12/24 (2006.01)
G06F 9/455 (2018.01)
G06F 16/11 (2019.01)
G06F 16/25 (2019.01)

(52) U.S. Cl.
CPC .......... H04L 43/04 (2013.01); G06F 9/45558 (2013.01); G06F 16/113 (2019.01); G06F 16/258 (2019.01); H04L 41/0886 (2013.01); H04L 41/0893 (2013.01); G06F 2009/45595 (2013.01); H04L 41/02 (2013.01); H04L 43/0817 (2013.01)

(58) Field of Classification Search
CPC ..... H04L 43/04; H04L 41/02; H04L 43/0817; H04L 41/0886; H04L 41/0893; G06F 16/113; G06F 16/258; G06F 17/30073; G06F 17/30569; G06F 9/45558; G06F 2009/45595
See application file for complete search history.

(56) References Cited

U.S. PATENT DOCUMENTS

| 9,251,115 | B2* | 2/2016 | Bursell | G06F 15/177 |
| 2011/0029882 | A1 | 2/2011 | Jaisinghani | |
| 2017/0063720 | A1* | 3/2017 | Foskett | H04L 67/2804 |
| 2018/0131585 | A1* | 5/2018 | Bliesner | H04L 43/045 |

(Continued)

OTHER PUBLICATIONS

David J. Cappuccio, "Use a TCO Model to Estimate the Costs of Your Data Center", Jun. 26, 2012, 9 pages.

(Continued)

Primary Examiner — Benjamin M Thieu
(74) Attorney, Agent, or Firm — Mannava & Kang, P.C.

(57) ABSTRACT

According to examples, an apparatus may include a processor and a memory on which is stored machine readable instructions that when executed cause the processor to receive first data from a first data provider in a cloud platform, receive second data from a second data provider in the cloud platform, the second data being a different type of data than the first data, and the first data and the second data pertaining to network elements in the cloud platform. The instructions may also cause the processor to normalize the first data and the second data and based on an analysis of the normalized first data and the second data, identify an action to be executed in the cloud platform. The instructions may further cause the processor to instruct a dispatcher to execute the action.

20 Claims, 5 Drawing Sheets

(56) References Cited

U.S. PATENT DOCUMENTS

2018/0288045 A1* 10/2018 Karunakaran ........ H04L 63/205

OTHER PUBLICATIONS

Geap, "Cloud Native Application Development—A New Computing Paradigm", Oracle White Paper, Feb. 2017, 22 pages.
Intel, "Building the Business Case for Data Center Modernization", White Paper, 2014, 17 pages.
Isaca, "Calculating Cloud ROI: From the Customer Perspective", Cloud Computing Vision Series White Paper, Jul. 2012, 17 pages.
Koomey et al., "A Simple Model for Determining True Total Cost of Ownership for Data Centers", White Paper, Uptime Institute, 2006-2007, 9 pages.

\* cited by examiner

MANAGEMENT OF NETWORK ELEMENTS IN A CLOUD PLATFORM

BACKGROUND

A cloud platform includes a computer network, e.g., a data center or multiple data centers, having a plurality of network elements. The network elements include physical infrastructure components such as servers, routers, switches, firewalls, storage components, and other appliances. The network elements also include virtual infrastructure components such as hypervisors, controllers, virtual controllers, and other components. The network elements are typically sourced from various vendors and thus, the network elements often have unique properties and interfaces to access data from the network elements.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses and methods for managing network elements in a cloud platform, including network elements sourced from multiple sources, e.g., vendors, suppliers, developers, etc. Particularly, the apparatuses and methods disclosed herein may enable a processor to make decisions regarding actions to be executed by the network elements based on data collected from a diverse collection of data providers through, for instance, plugins corresponding to the performance of the network elements (CPU usage, memory used, etc.), networking performance data collection (packetsIn, packetsOut, errorPkts, etc.), or the like. In other words, the apparatuses disclosed herein may employ a plugin based architecture and thus, the apparatuses disclosed herein may receive additional data from other data providers by adding new plugins for the other data providers to the apparatuses.

The data providers may provide data pertaining to both physical infrastructure components and virtual infrastructure components in the cloud platform. The data providers may collect data from network elements that are sourced from multiple sources as well as different types of network elements and may communicate the collected data to the apparatuses. The apparatuses may normalize the collected data as well as identify an action to be executed in the cloud platform based on an analysis of the collected data against policies, which may be user-defined policies. In one regard, the apparatuses and methods disclosed herein may collect and may process a diverse set of data to manage network elements in a cloud platform and may thus function as an integrated manager of network elements sourced from diverse sources.

The apparatuses and methods disclosed herein may manage the network elements in the cloud platform to, for instance, address issues such as virtual machine sprawl, para-virtualization (e.g., containers), under-utilized capacity, improving virtual machine density on compute nodes, capacity planning, etc. The apparatuses and methods disclosed herein may manage the network elements in the cloud platform to optimize application performance by moving workloads from under-utilized nodes to other nodes to free up resources and by moving workloads from over-utilized or saturated nodes onto other nodes. As such, for instance, the cloud platform, e.g., a data center, may be operated at desired levels of optimal utilization by spreading out or pulling in workloads. As noted herein, the apparatuses and methods disclosed herein are able to manage a diverse set of network elements using data collected from a diverse set of data collectors.

A technical problem associated with conventional network element management is that network elements sourced from a particular source may be managed separately from network elements sourced from another source. In this regard, even though the network elements are part of the same cloud platform, e.g., the same data center, the network elements may not be managed in a comprehensive manner, which may result in inefficiencies with respect to the operations of the network elements. As noted herein, the apparatuses and methods disclosed herein may enable for management of the network elements in a cloud platform to be implemented in a comprehensive manner across elements from multiple sources and over distributed data centers. That is, for instance, decisions regarding movement of workloads, migration of virtual machines (within same data centers or across multiple data centers), shutting down or nodes, etc., under the apparatuses and methods disclosed herein may be made based on a greater amount of diverse information. As such, a technical improvement corresponding to the apparatuses and methods disclosed herein may be that the network elements may be managed in manners that may result in minimized energy costs, maximized satisfaction of performance goals and guarantees, etc.

Before continuing, it is noted that as used herein, the terms "includes" and "including" mean, but is not limited to, "includes" or "including" and "includes at least" or "including at least." The term "based on" means "based on" and "based at least in part on."

Figure 1A:
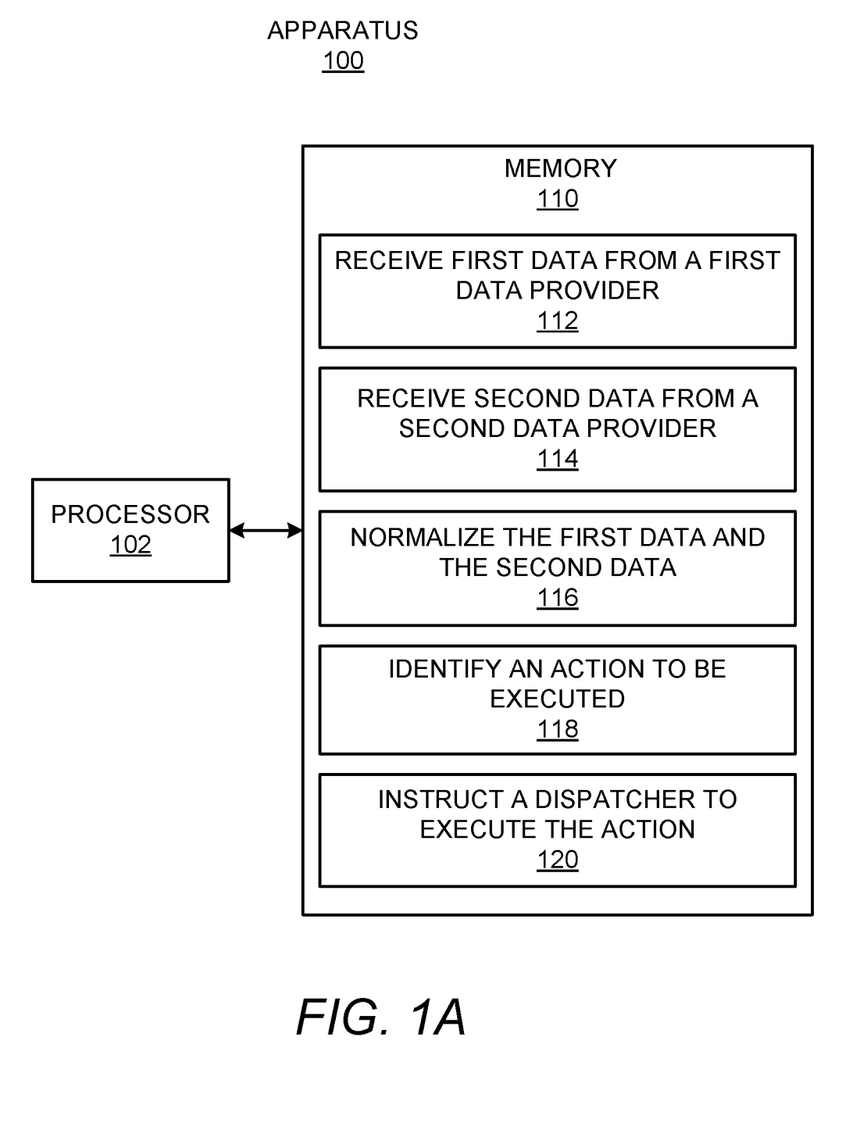
FIGS. 1A and 1B, respectively, show block diagrams of example apparatuses that manage a cloud platform.
Figure 1B:
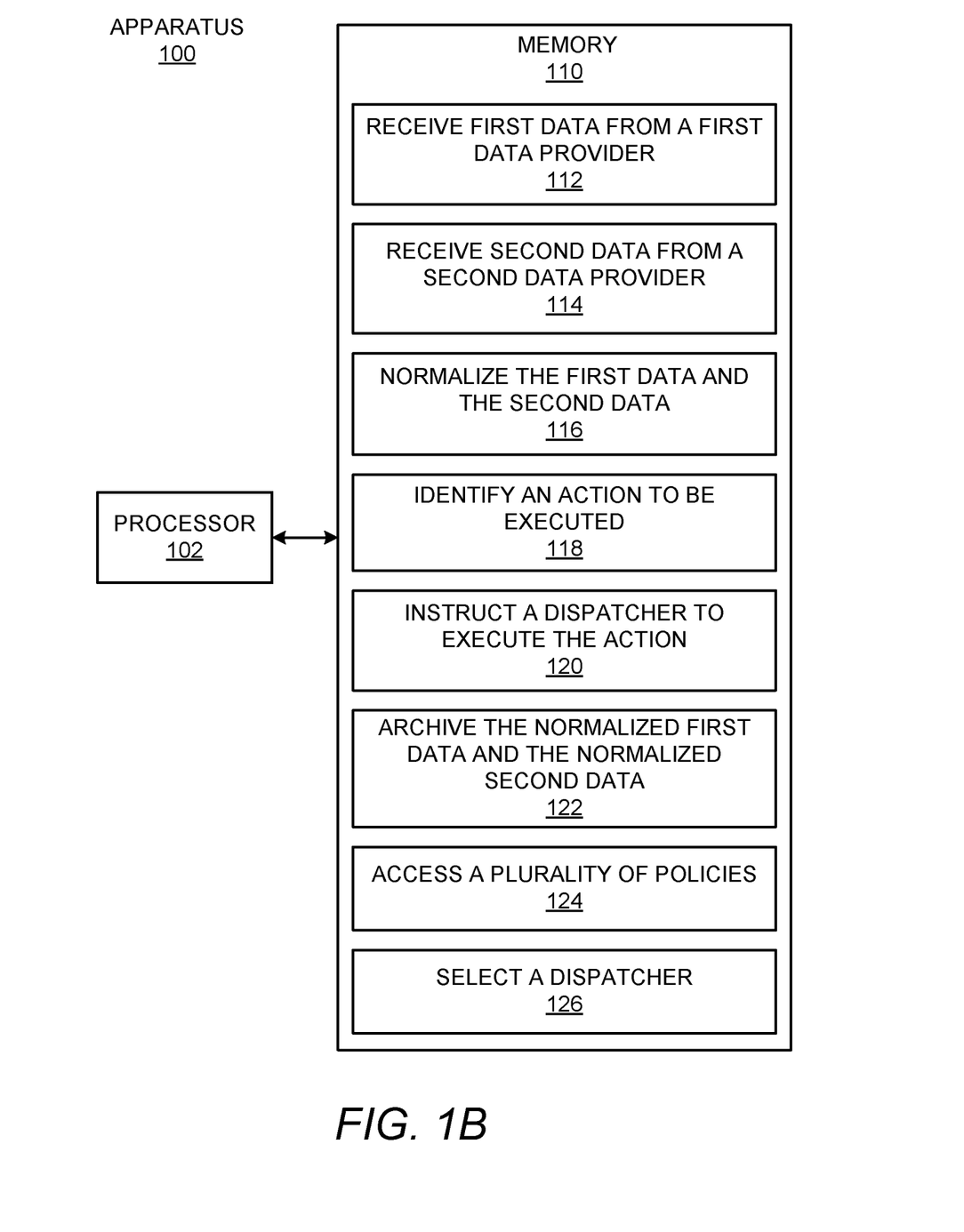

With reference first to FIGS. 1A and 1B, there are respectively shown block diagrams of example apparatuses 100 that manage a cloud platform. The apparatus 100 shown in FIG. 1B is depicted as including additional instructions as compared with the apparatus 100 shown in FIG. 1A. It should be understood that the example apparatuses 100 depicted in FIGS. 1A and 1B may include additional features and that some of the features described herein may be removed and/or modified without departing from the scopes of the apparatuses 100.

As shown, the apparatuses 100 may include a processor 102 that may control some operations in a cloud platform. The processor 102 may be a semiconductor-based microprocessor, a central processing unit (CPU), an application specific integrated circuit (ASIC), a field-programmable gate array (FPGA), and/or other hardware device. The apparatuses 100 are depicted as including a single processor 102 for purposes of illustration. In some examples, the apparatuses 100 may each include multiple processors 102 and/or processors 102 having multiple cores. In this regard, multiple processes may concurrently be implemented in the apparatuses 100 through implementation of multiple processors 102 and/or multiple core processors 102.

The apparatuses 100 may also include a memory 110 that may have stored thereon machine readable instructions (which may also be termed computer readable instructions) that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals. The apparatuses 100 are depicted as including a single memory 110 for purposes of illustration and thus, it should be understood that the apparatuses 100 may include multiple memories 110 without departing from scopes of the apparatuses 100.

Figure 2:
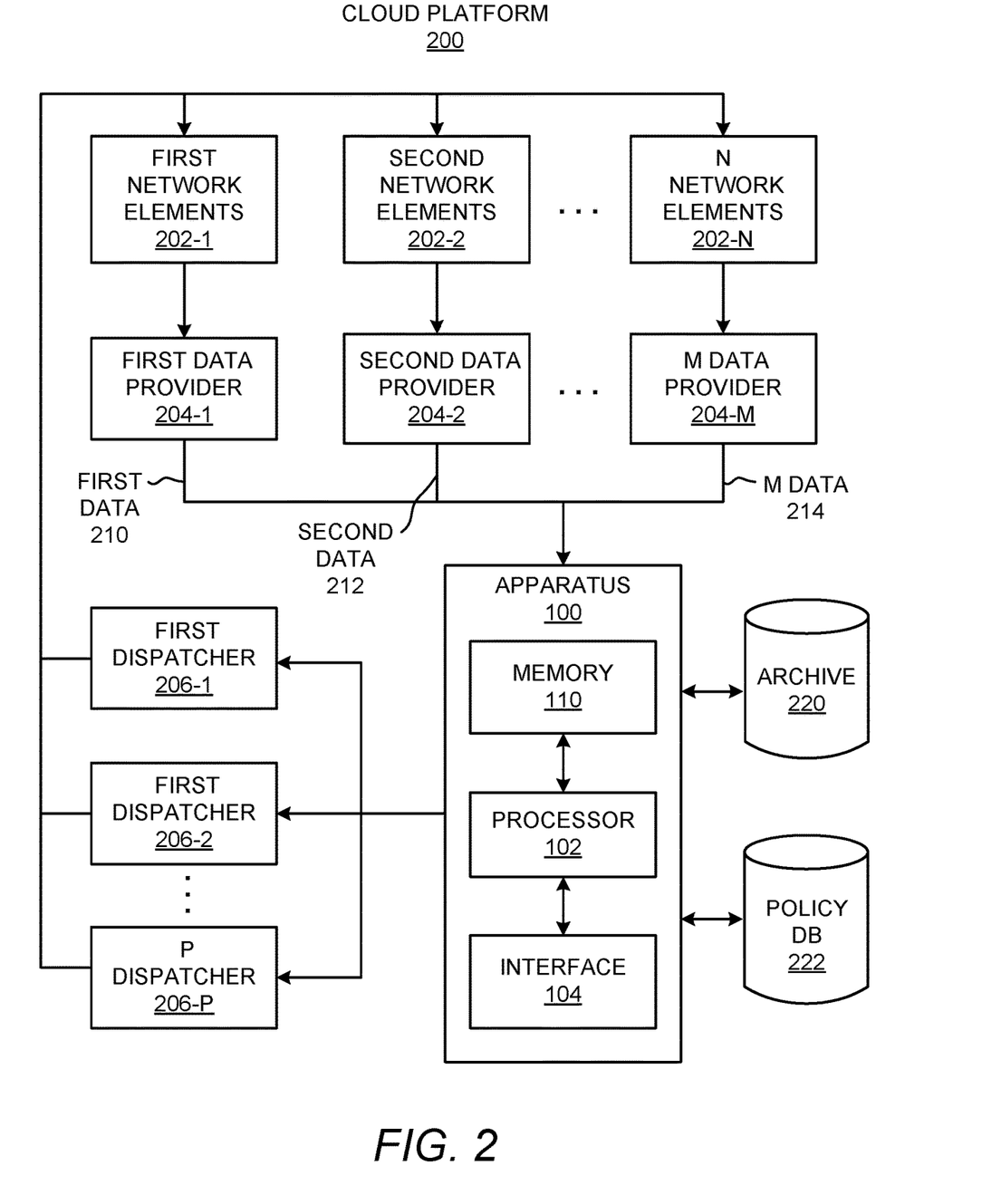
FIG. 2 shows a block diagram of an example cloud platform that may include the apparatus depicted in either of FIGS. 1A and 1B.

The apparatuses 100 depicted in FIGS. 1A and 1B are described in detail with respect to an example cloud platform 200 depicted in FIG. 2. Particularly, FIG. 2 depicts a block diagram of an example cloud platform 200, which may include the apparatus 100 depicted in FIG. 1A or 1B. The cloud platform 200 may be a collection of network components that may be part of a data center or parts of multiple data centers. As such, the network components in the cloud platform 200 may be positioned in a single geographic location, such as a building or multiple buildings in a particular location, or in multiple geographic locations, such as different states, continents, or the like.

As shown, the cloud platform 200 may include the apparatus 100, which may be server or other computing device in a data center or other structure. The cloud platform 200 may also include network elements 202-1 to 202-n, in which the variable "n" may represent a value greater than one. Some of the network elements 202 may be physical infrastructure components such as servers, networking equipment, firewalls, storage components, and the like. In addition, some of the network elements 202 may be virtual infrastructure components such as hypervisors, controllers, virtual controllers, and the like. Moreover, some of the network elements 202 may be application infrastructure components such as applications executed by physical servers, virtual machines, and the like. By way of example, some of the network elements 202 may be a plurality of nodes that host virtual machines, others of the network elements 202 may be the virtual machines hosted on the nodes, and still others of the network elements 202 may be applications executed by the virtual machines.

The cloud platform 200 may also include data providers 204-1 to 204-M, in which the variable "m" may represent a value greater than one. The data providers 204 may collect data from the network elements 202 and may communicate the collected data to the apparatus 100. The data providers 204 may collect the data through any suitable mechanism for tracking performance of the network elements 202 or through any suitable mechanism for receiving tracked performance data from the network elements 202.

A first data provider 204-1 may collect data from a first set of network elements 202-1, a second data provider 204-2 may collect data from a second set of network elements 202-2, and so forth. The data providers 204 may execute different types of monitoring applications that are to collect the information from the different types of network elements 202. That is, for instance, the first data provider 204-1 may collect data pertaining to physical infrastructure components in the cloud platform 200, the second data provider 104-2 may collect data pertaining to virtual infrastructure components in the cloud platform 200, the third data provider 104-3 may collect data pertaining to application infrastructure components in the cloud platform 200, etc.

According to examples, the first set of network elements 202-1 may be network elements sourced from a first source, the second set of network elements 202-2 may be network elements sourced from a second source, and so forth. In this regard, the data providers 204 may collect different types of data as well as data in different formats with respect to each other. That is, the first data provider 204-1 may collect data from network elements sourced from one source, the second data provider 204-2 may collect data from network elements source from a second source, etc. In addition, or in other examples, the first data provider 204-1 may collect a first type of data from network elements 202 sourced from multiple sources, the second data provider 204-2 may collect a second type of data from network elements 202 sourced from multiple sources, etc.

By way of example, the first data provider 204-1 may collect data pertaining to the utilization of the physical infrastructure components (which may also be termed physical infrastructure network components) in the cloud platform 200 sourced from one or a plurality of sources. In addition, the second data provider 204-2 may collect data pertaining to the utilization of virtual infrastructure components (which may also be termed virtual infrastructure network components) in the cloud platform 200 sourced from one or a plurality of sources. Moreover, the third provider 204-3 may collect data pertaining to the utilization of application infrastructure components in the cloud platform 200 sourced from one or a plurality of sources.

By way of particular example, the first data provider 204-1 may collect utilization levels of the central processing units (CPUs) in a plurality of servers sourced from a first source, the second data provider 204-2 may collect utilization levels of the CPUs in a plurality of servers sourced from a second source, and so forth. In other examples, the first data provider 204-1 may collect utilization levels of the CPUs in a plurality of servers sourced from multiple sources, the second data provider 204-2 may collect utilization levels of the virtual machines hosted on the plurality of servers sourced from a source or from multiple sources, the third data provider 204-3 may collect utilization levels of the applications executed by the virtual machines hosted on the plurality of servers sourced from a source or from multiple sources, and so forth. In addition or alternatively to CPU utilization, the data providers 204 may collect data pertaining to disk utilization, memory utilization, input/output flow, flow rules, or other intrinsic parameters.

By way of particular example, the first data provider 204-1 may be a device in the cloud platform 200 that implements the OneView™ infrastructure management platform available from HPE™ of Palo Alto, Calif., the second data provider 204-2 may be a device in the cloud platform 200 that implements Collectd™, and the third data provider 204-3 may be a device in the cloud platform 200 that implements a syslog infrastructure management platform. An example of another data provider 204-4 is the Open vSwitch Database™.

The cloud platform 200 may also include dispatchers 206-1 to 206-p, in which the variable "p" may represent a value greater than one. The dispatchers 206 may include devices that include functionalities to control actions on the network elements 202. Particularly, for instance, the dispatchers 206 may include functionalities, e.g., computer readable instructions, applications, programs, etc., to control actions on different types of network elements 202. That is, for instance, a first dispatcher 206-1 may include functionalities to control actions on the first network elements 202-1, a second dispatcher 206-2 may include functionalities to control actions on the second network elements 202-2, and so forth. In this regard, the first dispatcher 206-1 may control functionalities of the physical infrastructure components, the second dispatcher 206-2 may control functionalities of the virtual infrastructure components, the third dispatcher 206-3 may control functionalities of the application infrastructure components, and so forth. By way of particular example, a first dispatcher 206-1 may be an OpenStack dispatcher, a second dispatcher 206-2 may be a VMWare™ dispatcher, a third dispatcher 206-3 may be a RedFish™ dispatcher, a fourth dispatcher 206-4 may be an intelligent platform management interface (IPMI) dispatcher, a fifth dispatcher 206-5 may be an HPE iLO4™ dispatcher, etc.

The apparatus 100 may include a plurality of plugins for the data providers 204 and a plurality of plugins for the dispatchers 206, e.g., the plugins may correspond to the performance of the network elements (CPU usage, memory used, etc.), networking performance data collection (packetsIn, packetsOut, errorPkts, etc.), or the like. The plugins may be respective software components that enable the apparatus to receive the data from the data providers 204 and to send instructions to the dispatchers 206. In addition, as the apparatus 100 interacts with additional data providers 204 and/or dispatchers 206, additional plugins for the additional data providers 204 and/or dispatchers 206 may be added to the apparatus 100.

As discussed herein, the processor 102 of the apparatus 100 may process the data received from the data providers 204 to identify an action to be executed on the network elements 202. The processor 102 may also determine which dispatcher 206 is to cause the action to be performed based on the processing of the data. That is, for instance, the processor 102 may identify a particular dispatcher 206 that includes the functionality to cause the action to be performed by a particular network element 202. In addition, the processor 102 may send an instruction to the identified dispatcher 206 to execute the action on a network element 202.

With reference back to FIGS. 1A and 1B and also with reference to FIG. 2, the processor 102 may fetch, decode, and execute the instructions 112 to receive first data 210 from a first data provider 204-1 in a cloud platform 200. The processor 102 may fetch, decode, and execute the instructions 114 to receive second data 212 from a second data provider 204-2 in the cloud platform 200. The processor 102 may also execute additional instructions to receive data 214 from other data providers 204-3 to 204-m. As discussed above, the data providers 204 may collect data from the network elements 202 through any suitable mechanism for tracking and/or receiving the performance data from the network elements 202. In addition, the processor 102 may receive the data 210, 212 via an interface 104, which may include hardware and/or software components in the apparatus 100 through which data may be received. For instance, the interface 104 may include a network interface card.

The processor 102 may fetch, decode, and execute the instructions 116 to normalize the received first data 210 and the received second data 212. The processor 102 may normalize the data 210, 212 by correlating the first data 210 and the second data 212 with respect to each other. For instance, the processor 102 may analyze the first data 210 and the second data 212 for any commonalities. By way of example, the processor 102 may determine that the first data 210 is correlated to the second data 212 if, for instance, the first data 210 corresponds to a node that hosts a virtual machine corresponding to the second data 212. Similarly, the processor 102 may determine that the first data 210 is not correlated to the second data if, for instance, the first data 210 corresponds to a node that does not host the virtual machine corresponding to the second data 212. The processor 102 may also correlate the timing at which the first data 210 and the second data 212 were received.

The processor 102 may further normalize the first data 210 and the second data 212 by converting the first data 210 and the second data 212 into a machine readable format, for instance, such that the converted data may be used in machine learning processes. As noted above, the first data 210 may pertain to a physical infrastructure component and the second data 212 may pertain to a virtual infrastructure component. Particularly, for example, the first data 210 may pertain to CPU usage of a plurality of nodes and the second data 212 may pertain to the performance of a plurality of virtual machines hosted on the plurality of nodes.

In some examples, the processor 102 may fetch, decode, and execute the instructions 122 to archive the normalized first data 210 and the normalized second data 212 in to an archive 220. Particularly, the processor 102 may log the normalized first data 210 and the normalized second data 212 as a time-series database and/or a NoSQL database in the archive 220. The instructions 122 may be a set of application protocol interface (API) calls that log the normalized first data 210 and the normalized second data 212 as a time-series database and/or a NoSQL database in the archive 220. The archive 220 may be a data store that may be separate from the apparatus 100 or may be part of the apparatus 100.

The processor 102 may fetch, decode, and execute the instructions 118 to identify an action to be executed based on an analysis of both the normalized first data 210 and the normalized second data 212. In addition, the processor 102 may fetch, decode, and execute the instructions 124 to access a plurality of policies, for instance, from a policy database 222. The policy database 222 may be a data store that may be separate from the apparatus 100 or may be part of the apparatus 100.

The processor 102 may compare the normalized first data 210 and the normalized second data 212 with respect to a plurality of policies stored in the policy database 220. That is, for instance, the processor 102 may determine from the normalized first data 210 and the normalized second data 212 whether a policy is being violated, whether policies are being followed, whether a policy indicates that an action is to be performed, etc. Generally speaking, the policies may be policies that a user may define and store in the policy database 222, for instance, through a natural language interface. For example, a user may define specific resources to be monitored and may define specific remedial actions to take when the resources meet certain thresholds. The resources may include, for instance, CPU utilization, memory utilization, disk utilization, input/output operations per second (IOPS), network IO, flow tables, etc. Examples of policies may include setting high, optimum and low thresholds for various resources and an associated action for each threshold. Examples of actions may include, for instance, shutting down of nodes, disabling of specific components within a node, e.g., a CPU, NIC card, or the like, coalescing of instances on a single node and binding virtual machines to a socket, etc. By way of example, the policies may be in the form of "if-then" statements. The policies may be directed to, for instance, meeting service level guarantees, minimizing power consumed by the network elements 202, minimizing consumption of cooling resources by the network elements 202, etc. The processor 102 may further determine the action that is to be taken.

The processor 102 may fetch, decode, and execute the instructions 120 to instruct a dispatcher 206 to execute the determined action. In addition, the processor 102 may fetch, decode, and execute the instructions 126 to select a dispatcher 206 to which the instructions to execute the determined action is to be sent. The processor 102 may select the dispatcher, for instance, based on the type of action that is to be taken. For example, in instances in which the action is a physical infrastructure component action, e.g., shutting down of a node (e.g., server), the processor 102 may send the instruction to a first dispatcher 206-1 to execute the determined action. Likewise, in instances in which the action is a virtual infrastructure component action, e.g., migration of a virtual machine to another host node, the processor 102 may send the instruction to a second dispatcher 206-2. In some examples, the processor 102 may select and instruct multiple ones of the dispatchers 206 to execute actions on their respective network elements 202.

In any regard, in response to receipt of the instruction, the dispatcher 206 may cause the determined action to be executed. For instance, the first dispatcher 206-1 may control or otherwise cause a network element 202 to change an operation according to the determined action. The change in operation may include, for instance, scaling-up of compute capabilities (CPU/Memory), migration of a virtual machine, the shutting down of a node, the spinning up of a new node, etc.

Figure 3:
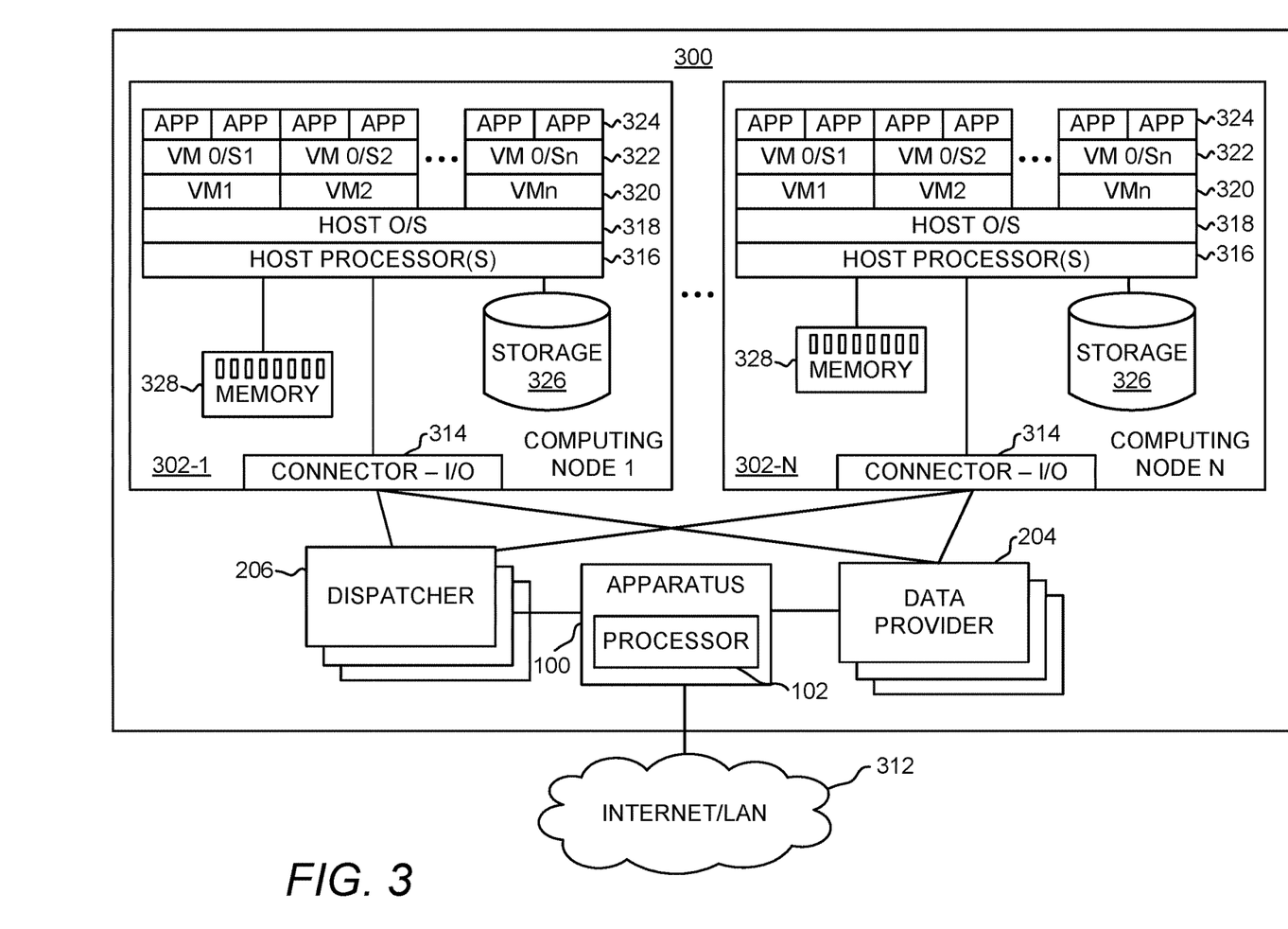
FIG. 3 shows a block diagram of an example data center in which the apparatus depicted in FIGS. 1A, 1B, and 2 and the network elements depicted in FIG. 2 may be implemented.

With reference now to FIG. 3, there is shown a block diagram of an example data center 300 in which the apparatus 100 depicted in FIGS. 1A, 1B, and 2 and the network elements 202 depicted in FIG. 2 may be implemented. It should be understood that the example data center 300 depicted in FIG. 3 may include additional components and that some of the components described herein may be removed and/or modified without departing from a scope of the data center 300. The data center 300 may be equivalent to a cloud platform 200 or may be part of a cloud platform 200.

Generally speaking, the data center 300 may provide cloud computing services or distributed computing services. The data center 300 may include the apparatus 100, the processor 102, and the memory 110 depicted in FIGS. 1A, 1B, and 2 as well as the data providers 204, dispatchers 206, archive 220, and the policy database 222. The data center 300 may also include a plurality of computing nodes 302, e.g., servers, blades, etc., which may be equivalent to the network elements 202. The apparatus 100 may manage data traffic between the computing nodes 302 and between the data center 300 and external resources and users (not shown) via an external network 312, which may be, for example, a local area network (LAN) or the Internet. In other examples, however, another device in the data center 300 may manage the data traffic.

The computing nodes 302 may be standalone computing devices and/or they may be individual blades in a rack of one or more server devices. The computing nodes 302 may have an input/output (I/O) connector 314 that may manage communication with other data center 300 entities. One or more host processors 316 on each computing node 302 may run a host operating system (O/S) 318 that may support multiple virtual machines (VM) 320, which may also be equivalent to the network elements 202. Each VM 320 may run its own O/S so that each VM O/S 322 on a computing node 302 may be different, or the same, or a mix of both. The VM O/S's 322 may be, for example, different versions of the same O/S (e.g., different VMs running different current and legacy versions of an operating system). In addition, or as another example, the VM O/S's 322 may be provided by different manufacturers (e.g., some VMs may run the Windows® operating system, while other VMs may run the Linux® operating system). Each VM 320 may also run one or more applications (App) 324. Each of the computing nodes 302 may also include storage 326 (e.g., hard disk drives (HDD)) and memory 328 (e.g., RAM) that the host processors 316 and the VMs 320 may access and use for storing software code, data, etc.

The data center 300 may provide pooled resources on which clients may dynamically provision and scale applications 324 as needed without having to add servers or additional networking. This may allow clients to obtain computing resources without having to procure, provision, and manage infrastructure on a per-application, ad-hoc basis. The data center 300 may allow clients to scale up or scale down resources dynamically to meet their current needs. For example, a client may initially use one VM 320 on a computing node 302-1 to run their applications 324. When demand for an application 324 increases, the apparatus 100 may cause additional VMs 320 to be activated in the data center 300 on the same computing node 302-1 and/or on a new computing node 302-N as needed (the variable "N" may represent an integer value that is greater than 1). The apparatus 100 may also cause the VMs 320 to be deactivated if demand for the application 324 later drops.

Figure 4:
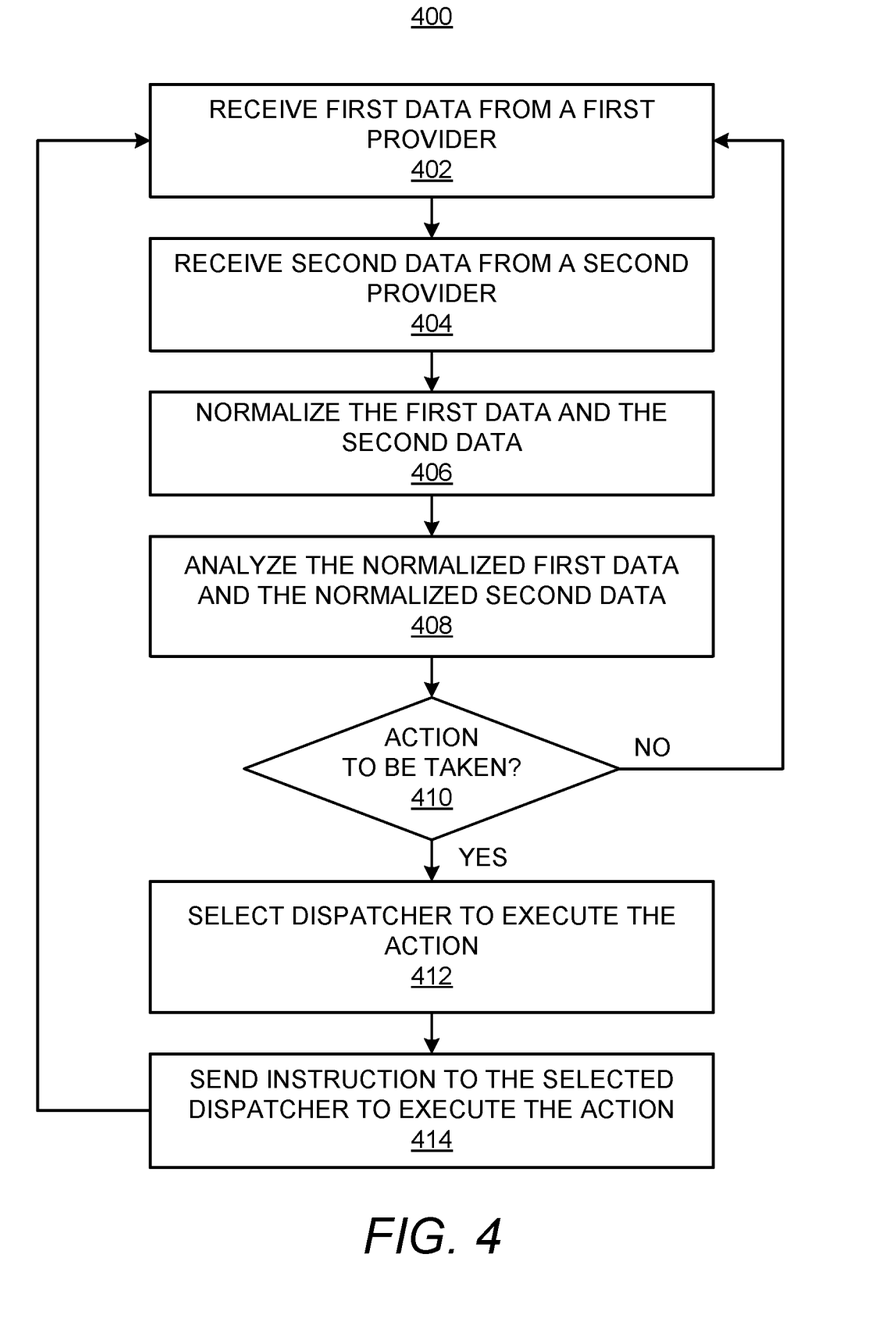
FIG. 4 depicts a flow diagram of an example method for managing network elements in a cloud platform.

Various manners in which the apparatus 100, and more particularly, the processor 102, may operate are discussed in greater detail with respect to the method 400 depicted in FIG. 4. Particularly, FIG. 4 depicts a flow diagram of an example method 400 for managing network elements 202 in a cloud platform 200. It should be understood that the method 400 depicted in FIG. 4 may include additional operations and that some of the operations described therein may be removed and/or modified without departing from scope of the method 400. The description of the method 400 is made with reference to the features depicted in FIGS. 1A-3 for purposes of illustration.

At block 402, the processor 102 may execute the instructions 112 to receive first data 210 from a first data provider 204-1. The apparatus 100 may include a plugin that includes instructions to receive the first data 210 from the first data provider 204-1. In addition, the first data 210 may pertain to physical infrastructure components, such as physical compute nodes, in the cloud platform 200. By way of example, the first data 210 may include data pertaining to CPU utilization in a plurality of computing nodes 302.

At block 404, the processor 102 may execute the instructions 114 to receive second data 212 from a second data provider 204-2. The apparatus 100 may include a plugin that includes instructions to receive the second data 212 from the second data provider 204-2. In addition, the second data 212 may pertain to virtual infrastructure components, such as virtual machines 320 executing on computing notes 302 in the cloud platform 200. By way of example, the second data 212 may include data pertaining to the performance of virtual machines 320 in a plurality of computing nodes 302.

At block 406, the processor 102 may execute the instructions 116 to normalize the received first data 210 and the received second data 212. The processor 102 may normalize the first data 210 and the second data 212 by correlating the first data 210 and the second data 212 with respect to each other. The processor 102 may also normalize the first data 210 and the second data 212 by converting the first data 210 and the second data 212 into a machine readable format. For instance, the processor 102 may convert the first data 210 and the second data 212 such that a machine learning algorithm may analyze the first data 210 and the second data.

The processor 102 may also execute the instructions 122 to archive the normalized first data 210 and the normalized second data 212 in an archive 220. For instance, the processor 102 may archive the normalized first data 210 and the normalized second data 212 as a time-series database and/or a NoSQL database.

At block 408, the processor 102 may execute the instructions 118 to analyze the normalized first data 210 and the normalized second data 212. Particularly, the processor 102 may analyze both the normalized first data 210 and the normalized second data 212 to identify an action to be executed in some of the network elements 202 in the cloud platform 200 as indicated at block 410. The processor 102 may analyze the normalized first data 210 and the normalized second data 212 by comparing the data 210, 212 against policies stored in the policy database 222. For instance, the processor 102 may determine that the data 210, 212 indicates that any performance guarantees are not being met, that any computing nodes 302 are operating inefficiently and that operations of the computing nodes 302 may be modified to improve efficiency, that virtual machines are not being utilized effectively, etc. As other examples, the processor 102 may read the time-series and/or NoSQL database stored in the archive 220 to determine if a certain event, for instance, as defined by a policy, has occurred.

In response to a determination that an action is not to be taken, the processor 102 may continue to receive first data 210 at block 402 and second data 212 at block 404 and may repeat blocks 402-410 until a determination is made that an action is to be taken 410 or if the method 400 is ended.

According to examples, the processor 102 may identify an action to be taken or executed from an analysis of both the first data 210 and the second data 212. That is, for instance, the processor 102 may not automatically determine that an action is to be taken in response to the first data 210 indicating, for instance, an unintended spike in the CPU utilization of a particular computing node 302. Likewise, for instance, the processor 102 may not automatically determine that an action is to be taken in response to the second data 212 indicating, for instance, that a virtual machine is reaching a particular limit. Instead, the processor 102 may determine that an action is to be taken in response to a combination of factors. By way of example, the processor 102 may determine from the first data 210 and the second data 212 that a particular computing node 302-1 is operating a relatively low CPU utilization level and that another computing node 302-2 is able to host additional virtual machines. In this example, the processor 102 may determine that the virtual machines hosted on the computing node 302-1 are to be migrated to the second computing node 302-2 and that the computing node 302-1 is to be powered off or placed into a lower power state.

In response to a determination to that an action is to be taken at block 410, the processor 102 may execute the instructions 126 to select a dispatcher 206 that is to execute the action, as indicated at block 412. The processor 102 may select the dispatcher 206 based on the action that is to be taken. For instance, the processor 102 may select a first dispatcher 206-1 in response to the action that is to be taken involving a physical infrastructure component. As another example, the processor 102 may select a second dispatcher 206-2 in response to the action that is to be taken involving a virtual infrastructure component. In addition or in further examples, the processor 102 may select the dispatcher 206 based on, for instance, the source of the network component 202 that is to perform the action.

At block 414, the processor 102 may execute the instructions 120 to instruct the dispatcher 206 selected at block 412 to execute the action. In determining that an action is to be taken, the processor 102 may also determine the action that is to be taken and may include the action that is to be taken in the instruction sent to the selected dispatcher 206. In response to receipt of the instruction from the processor 102, the dispatcher 206 may send a command or may otherwise instruct a network element 202 to perform the action.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory communicatively coupled to the processor and on which is stored machine readable instructions, that when executed by the processor, cause the processor to:
   receive first data, in a first data type at a first time, from a first data provider in a cloud platform;
   receive second data, in a second data type at a second time, from a second data provider in the cloud platform, the second data type being a different type of data than the first data type, and the first data and the second data pertaining to measured metrics obtained from associated network elements in the cloud platform;
   normalize the first data and the second data by correlating the first data and the second data based on an attribute associated with both the first data and the second data to create a normalized first data and a normalized second data;

based on analysis of the normalized first data and the normalized second data, identify an action to be executed in the cloud platform; and instruct a dispatcher to initiate execution of the action.

2. The apparatus according to claim 1, wherein the instructions, when executed by the processor, are further to cause the processor to:

archive the normalized first data and the normalized second data into an archive as at least one of a time-series database or a NoSQL database.

3. The apparatus according to claim 1, wherein the first data pertains to physical infrastructure network components in the cloud platform and the second data pertains to virtual infrastructure network components in the cloud platform.

4. The apparatus according to claim 1, wherein the instructions, when executed by the processor, cause the processor to:

access a plurality of policies; and identify the action to be executed in the platform via comparison of the normalized first data and the normalized second data to the accessed plurality of policies.

5. The apparatus according to claim 1, wherein the instructions, when executed, cause the processor to:

prior to instructing a dispatcher to initiate execution of the action, select the dispatcher from a plurality of dispatchers based on the identified action, wherein the plurality of dispatchers are to dispatch actions to different types of network elements.

6. The apparatus according to claim 1, wherein to normalize the first data and the second data, the instructions, when executed by the processor, are further to cause the processor to:

correlate the first data and the second data with respect to the first time and the second time.

7. The apparatus according to claim 1, wherein to normalize the first data and the second data, the instructions, when executed by the processor, are further to cause the processor to:

transform the first data and the second data into a machine readable format for use in a machine learning process.

8. The apparatus according to claim 1, wherein to correlate the first data and the second data, the instructions, when executed by the processor, cause the processor to:

correlate the first data and the second data based on past behavior in the cloud platform or rules pertaining to the correlation.

9. The apparatus according to claim 1, wherein the first data pertains to information regarding operation of a plurality of nodes in the cloud platform and the second data pertains to information regarding operation of a plurality of virtual machines hosted on the plurality of nodes in the cloud platform, and wherein the instructions, when executed by the processor, cause the processor to:

determine, based on the analysis of the normalized first data and the normalized second data, whether a virtual machine of the plurality of virtual machines is to be migrated from a first node of the plurality of nodes to a second node of the plurality of nodes, whether a third node of the plurality of nodes is to be placed in a reduced power consumption mode, whether a fourth node of the plurality of nodes is to be placed in a higher power consumption mode, or a combination thereof.

10. A computer-implemented method comprising:

receiving first data, in a first data type at a first time, from a first data provider, the first data pertaining to physical infrastructure components in a cloud platform;

receiving second data, in a second data type at a second time, from a second data provider in the cloud platform, the second data pertaining to virtual infrastructure components in the cloud platform;

normalizing, by a processor, the first data and the second data by correlating the first data and the second data based on an attribute associated with both the first data and the second data to create a normalized first data and a normalized second data;

analyzing, by the processor, the normalized first data and the normalized second data to identify an action to be executed in the cloud platform;

selecting, by the processor, a dispatcher to initiate execution of the action; and sending, by the processor, an instruction to the selected dispatcher to initiate execution of the action.

11. The computer-implemented method according to claim 10, further comprising:

archiving the normalized first data and the normalized second data into an archive as at least one of a time-series database or a noSQL database.

12. The method according to claim 10, wherein analyzing the normalized first data and the normalized second data further comprises comparing the normalized first data and the normalized second data against a policy pertaining to the first data and the second data.

13. The method according to claim 10, wherein normalizing the first data and the second data comprises correlating the first data and the second data with respect to the first time and the second time.

14. The method according to claim 10, wherein normalizing the first data and the second data comprises transforming the first data and the second data into a machine readable format for use in a machine learning process.

15. The method according to claim 10, wherein selecting the dispatcher comprises selecting the dispatcher from a plurality of dispatchers based on the identified action to be executed, wherein the plurality of dispatchers are to dispatch actions to different types of network elements.

16. A non-transitory computer readable medium on which is stored machine readable instructions that when executed by a processor of a node are to cause the processor to:

receive first data, in a first data type at a first time, from a first data provider, the first data pertaining to physical nodes in a cloud platform;

receive second data, in a second data type at a second time, from a second data provider in the cloud platform, the second data pertaining to virtual machines in the cloud platform;

normalize the first data and the second data by correlating the first data and the second data based on an attribute associated with both the first data and the second data to create a normalized first data and a normalized second data; and analyze the normalized first data with the normalized second data with respect to a policy to identify an action to be executed with respect to a virtual machine in the cloud platform.

17. The non-transitory computer readable medium according to claim 16, wherein the instructions are to cause the processor to:

select a dispatcher to initiate execution of the action; and instruct the selected dispatcher to initiate execution of the action.

18. The non-transitory computer readable medium according to claim 17, wherein to select the dispatcher to execute the action, the instructions are to cause the processor to:
   select the dispatcher from a plurality of dispatchers based on the identified action to be executed, wherein the plurality of dispatchers are to dispatch actions to different types of network elements.

19. The non-transitory computer readable medium according to claim 16, wherein the instructions are to cause the processor to:
   archive the normalized first data and the normalized second data into an archive as at least one of a time-series database or a noSQL database.

20. The non-transitory computer readable medium according to claim 16, wherein to normalize the first data and the second data, the instructions are further to cause the processor to:
   correlate the first data and the second data with respect to the first time and the second time; and
   transform the first data and the second data into a machine readable format for use in a machine learning process.

\* \* \* \* \*